US006791163B2

(12) United States Patent
Kishimoto et al.

(10) Patent No.: US 6,791,163 B2
(45) Date of Patent: Sep. 14, 2004

(54) CHIP ELECTRONIC COMPONENT

(75) Inventors: Atsushi Kishimoto, Omihachiman (JP);
Hideaki Niimi, Hikone (JP); Akira Ando, Omihachiman (JP)

(73) Assignee: Murata Manufacturing Co. Ltd. (JP)

( * ) Notice: Subject to any disclaimer, the term of this patent is extended or adjusted under 35 U.S.C. 154(b) by 0 days.

(21) Appl. No.: 10/657,070

(22) Filed: Sep. 9, 2003

(65) Prior Publication Data

US 2004/0048052 A1 Mar. 11, 2004

(30) Foreign Application Priority Data

Sep. 10, 2002 (JP) ........................................ 2002-264579
Aug. 7, 2003 (JP) ........................................ 2003-289321

(51) Int. Cl.$^7$ ............................................. H01L 23/58
(52) U.S. Cl. ........................ 257/634; 257/532; 257/516
(58) Field of Search ................. 257/634, 532, 257/516

(56) References Cited

U.S. PATENT DOCUMENTS 6,522,521 B2 * 2/2003 Mizuno et al. .......... 361/321.4

FOREIGN PATENT DOCUMENTS

JP        2002-043167        8/2002

* cited by examiner

Primary Examiner—Luan Thai
(74) Attorney, Agent, or Firm—Dickstein, Shapiro, Morin & Oshinksy, LLP.

(57) ABSTRACT

A chip electronic component including a ceramic element and terminal electrodes with metal coating thereon formed on the surface of the ceramic element. A glass layer is formed on a part of the surface of the ceramic element where the terminal electrodes are not formed. A glass material for the glass layer contains at least two species of alkali metal elements selected from Li, Na and K, and the total amount of the alkali metal elements is greater than or equal to 20 atomic percent of the total amount of elements except oxygen contained in the glass material.

8 Claims, 1 Drawing Sheet

CHIP ELECTRONIC COMPONENT

BACKGROUND OF THE INVENTION

1. Field of the Invention

The present invention relates to a chip electronic component including a ceramic element and terminal electrodes having a metal coating disposed on the ceramic element.

2. Description of the Related Art

In recent years, needs for surface mountable electronic components have been increasing and therefore needs for chip electronic components have also been increasing. For example, a monolithic PTC thermistor is manufactured according to the following procedure: ceramic green sheets containing $BaTiO_3$ and conductive paste containing conductive powder such as Ni are alternately laminated, and sintered integrally to form a ceramic element. Then, terminal electrodes containing Ag or the like are each formed on the end faces of the ceramic element by a printing process.

A chip electronic component, manufactured according to the above procedure, is normally soldered when it is mounted on a substrate. During the soldering step, terminal electrodes of the component are in some cases partly melted into the solder (this phenomenon is so-called "soldering erosion") when the soldering temperature is higher than the melting point of the terminal electrodes or when the soldering time is extremely long. In order to prevent soldering erosion, the following method has been employed: metal coatings containing Ni or the like are formed on the corresponding terminal electrodes by an electroplating process before the soldering step.

However, when a ceramic element has a small sintered density, even if it is insulative, a plating solution permeates into the ceramic element and deteriorates its properties. Furthermore, when terminal electrodes sintered onto a semiconductive ceramic element are subjected to electroplating, there is a problem that metal coatings are also formed on portions of the element on which the terminal electrodes are not disposed.

In order to solve the above problems, the following method has been proposed: a ceramic element is soaked in a sodium-silicate, in which the atomic ratio of sodium to silicon is 0.6, to form a glass layer on the ceramic element (refer to Japanese Unexamined Patent Application Publication No. 2002-43167, pp., for example). Formation of such an insulative glass layer on the ceramic element prevents metal coatings from being formed on it. Furthermore, it has been thought that, by use of glass powder inclusive of a large amount of one of the alkali metal elements, the difference in shrinkage between the ceramic layer and the glass layer can be reduced, thereby preventing cracks in the glass layer, because a melting point of glass is lower than usual.

However, a chip electronic component having a glass layer thereon containing a large quantity of one of the alkali metal elements has proved to drop extremely in the dielectric strength according to the energization test.

SUMMARY OF THE INVENTION

Accordingly, an object of the present invention is to provide a chip electronic component where a sufficient dielectric strength is secured, and at the same time, a plating solution is prevented from permeation into a ceramic element due to generation of cracks in a glass layer when a glass layer is formed on the surface of a ceramic element.

In order to solve the above problems, a first preferred embodiment of the chip electronic component of the present invention includes a ceramic element and terminal electrodes having a metal coating thereon disposed on the surface of the ceramic element. A glass layer is disposed on at least portions of the ceramic element surface on which the terminal electrodes are not formed. The glass layer is made of a glass material containing at least two species of alkali metal elements selected from Li, Na and K, and the atomic total amount of the alkali metal elements is greater than or equal to 20 atomic percent of the atomic total amount of elements, except oxygen.

In this chip electronic component, formation of cracks in the glass layer and deterioration in its dielectric strength can be prevented. More specifically, when a large amount of alkali metal elements are contained in a glass material to form a glass layer, alkali metal elements are ionized and therefore ionic conduction takes place, whereby an electric current is allowed to flow on the surface of the chip electronic component and the dielectric strength is seriously deteriorated. Therefore, the inventors noticed that, from the fact that ion conduction takes place via positions exclusively occupied by alkali ions, by using two or more species of alkali ions to occupy two or more different positions in advance, the migration of the alkali ions is prevented. According to this configuration, even if a glass material to form a glass layer contains a large amount of alkali metal elements, the dielectric strength of a chip electronic component can be prevented from being deteriorated. Furthermore, the amount of the alkali elements contained in a glass material can be increased compared to the prior art and therefore the melting point of the glass layer can be lowered, which can prevent cracks in a glass layer more efficiently.

In the above chip electronic component, as a second preferred embodiment of the present invention, the above at least two species of alkali metal elements preferably include at least Li and K. When a combination of Li and K is employed as the two or more alkali metal elements, ionic conduction can be more securely prevented because of a large difference between the ionic radii of a Li ion and a K ion. Furthermore, this case of chip electronic component, which can be manufactured at low cost without deterioration in its properties, is suitable for mass-production.

In a third preferred embodiment of a chip electronic component of the present invention, among alkali metal elements contained in a glass layer, the atomic ratio of two species of alkali metal elements having a highest ranking much preferably falls in the range from 2:8 to 8:2. By control of the ratio of the alkali metal elements contained in the glass layer within this range, the above ionic conduction can be more efficiently prevented and a remarkable effect of suppression of deterioration in the dielectric strength can be brought out.

According to a fourth preferred embodiment of the present invention, the above ceramic element preferably contains a semi-conductive ceramic material. This case is more useful because metal coatings, which are readily formed on a ceramic element when the ceramic element is made of a semi-conductive ceramic material, can be prevented from being formed thereon due to the configurations according to the first or second preferred embodiment of the present invention.

DESCRIPTION OF THE PREFERRED EMBODIMENTS

Figure 1:
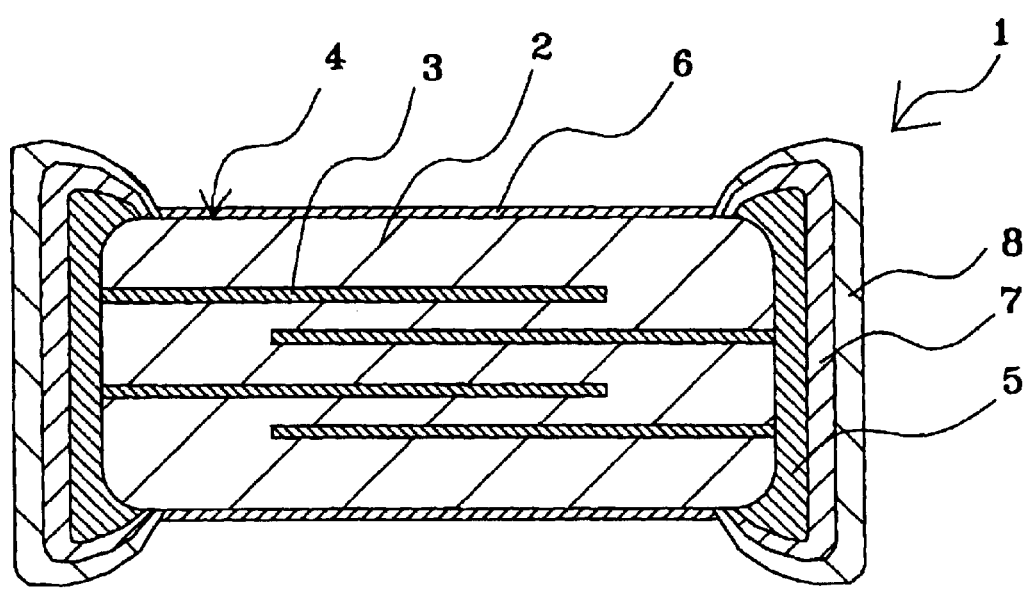
FIG. 1 is a schematic sectional view showing an embodiment of a chip electronic component according to the present invention.

A chip electronic component of the present invention will be described in detail with reference to the accompanying drawing.

FIG. 1 is a schematic sectional view showing an embodiment of the chip electronic component of the present invention. The chip electronic component 1 of the present invention includes a ceramic layer 2 and internal electrodes 3, to which terminal electrodes 5 electrically connected. A glass layer 6 is disposed on the surface of a ceramic element 4. Ni coating 7 and Sn coating 8 are disposed on the surface of each terminal electrode 5.

Alkali metal elements contained in a glass material to form the glass layer 6 are, specifically, Li having an ionic radius of 0.068 nm, Na having an ionic radius of 0.097 nm, and K having an ionic radius of 0.133 nm. Inclusion of two or more these alkali metal elements can prevent ionic conduction of the alkali metal elements. Among various combinations which may be used as the above combination of two or more alkali metal elements, a combination of Li and K is particularly preferable. With this combination, ionic conduction can be more securely prevented because of a large difference between the ionic radii of the two, and further, low-cost production is enabled without deterioration in the electric properties of the chip electronic component.

Also, among the alkali metal elements contained in the glass layer, the atomic ratio of the high-ranking two species of alkali metal elements whose containing amount is much preferably falls in the range from 2:8 to 8:2. When the ratio is outside of the range, the effectiveness, which can be obtained by giving two or more different occupied positions, is weakened.

Moreover, the atomic total amount of two or more species of the alkali metal elements preferably occupies greater than or equal to 20 atomic percent of the atomic total amount of the elements, other than oxygen, contained in the glass material. The use of a glass material with such composition prevents cracks from being formed in the glass layer 6. When the atomic total amount of the alkali metal elements is less than 20 atomic percent of the atomic total amount of the elements other than oxygen contained in the glass material, the effect that a melting point of glass is lowered drops off. Therefore, the difference in shrinkage between the glass layer 6 and the ceramic layer 2 cannot be decreased and thus cracks are apt to be formed in the glass layer 6, which is not preferable. There is no upper limit to the atomic total amount of the alkali metal elements, but the atomic total amount of the alkali metal elements is preferably less than or equal to 70 atomic percent of the atomic total amount of the elements other than oxygen contained in the glass material. When the atomic total amount of the alkali metal elements is greater than 70 atomic percent, glass cannot be obtained, that is, the glass layer 6 is not formed on the ceramic element 4.

The glass layer 6 can be also formed according to the procedure where glass powder together with an organic binder is dispersed and mixed into an organic solvent, and the mixture is applied as a glass paste onto the end face of the ceramic element 4 and sintered. Alternatively, the glass layer 6 can be formed according to the procedure where glass powder is dissolved in water to prepare a glass aqueous solution, in which the ceramic element 4 is soaked and then dried, though a method for forming the glass layer 6 is not limited to the above.

As a ceramic material for the ceramic layer 2, any of a semi-conductive material, a dielectric material, a piezoelectric material, a magnetic material and an insulative material can be used. In particular, a semi-conductive ceramic material provides great advantages. Such semi-conductive ceramic material includes transition element oxides with a negative temperature coefficient and zinc oxide with varistor characteristics, as well as oxides such as barium titanate with a positive temperature coefficient, for example, and is not limited to these materials.

The terminal electrodes 5 are preferably formed with a powder of an antioxidative noble metal such as Ag, Pd, Ag—Pd and Pt. A powder of base metal such as Ni and Cu may be used if the terminal electrodes 5 are sintered in an antioxidative atmosphere. As a formation method of the terminal electrodes 5, the method in which the ceramic layer 2, Ni electrode paste for forming the internal electrodes 3, and conductive paste for forming the terminal electrodes 5 are sintered at the same time to form both end faces of the ceramic element 4 may be employed. In addition, a method in which conductive paste is applied onto the sintered ceramic element 4 and burned may also be employed.

In particular, ceramic green sheets for forming the ceramic layer 2 and Ni electrode paste for forming the internal electrodes 3 are alternatively stacked, pressed, and cut into a predetermined size to form chips. After application of a semi-conductive paste for the terminal electrodes on their end faces, they are sintered in a reductive atmosphere to form the terminal electrodes 5 on the end faces of the ceramic element 4. By plating, Ni coating 7 and Sn coating 8 are formed on each terminal electrode 5, but materials for coating may be changed depending on compatibility with the metal powder used for the terminal electrode 5, and other than the above plating, solder plating can be used.

Below is a more specific explanation of a method for manufacturing a chip electronic component of the present invention, together with a method for manufacturing a chip PTC thermistor as an example.

EXAMPLE $BaTiO_3$, $TiO_2$, $Sm_2O_3$ and $MnCO_3$ were prepared as raw materials and then compounded so that the following formula was satisfied:

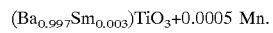

$(Ba_{0.997}Sm_{0.003})TiO_3+0.0005$ Mn.

After pure water was added, the compounded raw material powder was mixed and pulverized for 16 hours together with zirconia balls, and after drying it was sintered temporarily at 1,200° C. for two hours and pulverized to form a temporarily-sintered powder. To this temporarily-sintered powder, an organic binder, a dispersant and water were added and mixed for ten hours together with zirconia balls to form a ceramic slurry. This ceramic slurry was formed into sheets by a doctor blade process and dried to form ceramic green sheets. Next, Ni electrode paste was applied onto a principal face of each ceramic green sheet by a screen printing process so as to form a desired pattern. The ceramic green sheets were stacked so that the Ni electrode paste patterns were placed opposite to each other with a ceramic green sheet sandwiched therebetween, and protective ceramic green sheets having no Ni electrode paste were disposed at top and bottom thereof. The layers were pressed and cut into pieces with a size of 2.2 mm×1.4 mm×1.4 mm to form chips. Meanwhile, Ni electrode paste portions were exposed alternatively at both end faces of each chip. The green chips were sintered at 1,200° C. for two hours in a reductive atmosphere in which the hydrogen content is 3% of the nitrogen content, thereby obtaining a ceramic element 4 including ceramic layers 2 and internal electrodes 3 alternatively laminated.

Subsequently, aqueous solutions of alkali glass were prepared so that the solutions have composition shown in samples 1 to 19 in Table 1. Here, a solid part in this aqueous solutions was set to 20 weight %. In these solutions the ceramic elements 4 prepared according to the above process were soaked and after drying, sintered at 600° C. in the atmosphere to form a glass sub-layer on each ceramic element 4. This procedure was repeated twice to form a glass layer 6 consisting of two sub-layers. Conductive paste obtained from dispersion of Ag powder in an organic vehicle was applied onto both end faces of the ceramic element 4 having the glass layer 6 thereon. The conductive paste was sintered at 700° C. in the atmosphere, and the glass layer existing between the ceramic element 4 and the terminal electrodes 5 was dispersed into the terminal electrodes 5, so that conduction between the ceramic element 4 and the terminal electrodes 5 was secured. In addition, this step of sintering the conductive paste functions also as reoxidization of the ceramic element 4. Finally, Ni coating 7 and Sn coating 8 were sequentially applied on the terminal electrodes 5 by an electroplating process, to form a monolithic PTC thermistor 1.

TABLE 1

| Sample Number | Composition (mol..) | | | Composition Formula | Amount of Alkali atomic |
|---|---|---|---|---|---|
| | First Alkali Metal Element | Second Alkali Metal Element | $SiO_2$ | | |
| *1 | 4 | 4 | 92 | $4(Li_2O)4(K_2O)92(SiO_2)$ | 14.8 |
| *2 | 5 | 5 | 90 | $5(Li_2O)5(K_2O)90(SiO_2)$ | 18.2 |
| 3 | 6 | 6 | 88 | $6(Li_2O)6(K_2O)88(SiO_2)$ | 21.4 |
| 4 | 8 | 8 | 84 | $8(Li_2O)8(K_2O)84(SiO_2)$ | 27.6 |
| 5 | 10 | 10 | 80 | $10(Li_2O)10(K_2O)80(SiO_2)$ | 33.3 |
| 6 | 15 | 15 | 70 | $15(Li_2O)15(K_2O)70(SiO_2)$ | 46.2 |
| *7 | 20 | 0 | 80 | $20(Li_2O)80(SiO_2)$ | 33.3 |
| *8 | 20 | 0 | 80 | $20(K_2O)80(SiO_2)$ | 33.3 |
| *9 | 20 | 0 | 80 | $20(Na_2O)80(SiO_2)$ | 33.3 |
| *10 | 4 | 4 | 92 | $4(Na_2O)4(K_2O)92(SiO_2)$ | 14.8 |
| *11 | 5 | 5 | 90 | $5(Na_2O)5(K_2O)90(SiO_2)$ | 18.2 |
| 12 | 6 | 6 | 88 | $6(Na_2O)6(K_2O)88(SiO_2)$ | 21.4 |
| 13 | 10 | 10 | 80 | $10(Na_2O)10(K_2O)80(SiO_2)$ | 333 |
| 14 | 17 | 3 | 80 | $17(Li_2O)3(K_2O)80(SiO_2)$ | 33.3 |
| 15 | 16 | 4 | 80 | $16(Li_2O)4(K_2O)80(SiO_2)$ | 33,3 |
| 16 | 15 | 5 | 80 | $15(Li_2O)5(K_2O)80(SiO_2)$ | 33.3 |
| 17 | 5 | 15 | 80 | $5(Li_2O)15(K_2O)80(SiO_2)$ | 33.3 |
| 18 | 4 | 16 | 80 | $4(Li_2O)16(K_2O)80(SiO_2)$ | 33.3 |
| 19 | 3 | 17 | 80 | $3(Li_2O)17(K_2O)80(SiO_2)$ | 33.3 |

With the above samples, characteristics and physicalities were evaluated as to the following points. Evaluation results are shown in Table 2.

Presence or Absence of Cracks in Glass layer

The surface of the glass layer formed on the surface of each ceramic element of the monolithic PTC thermistors in samples 1 to 19 was inspected by an optical microscope to check whether there were cracks in the glass layer 6 or not.

Presence or Absence of Permeation of Plating Solution

The terminal electrodes 5 each having Ni coating 7 and Sn coating 8 thereon were removed from the monolithic PTC thermistors in samples 1 to 19. The ceramic element 4 with its terminal electrodes removed was dissolved by acid into a solution, and Sn amount contained in this solution was determined by ICP-AES analysis, a quantitative analysis based on a difference between the light energy of Sn element and the light energy of the other components.

Dielectric Strength

In order to inspect whether ionic conduction took place or not on the surface of the ceramic element, a predetermined voltage was applied to the monolithic PTC thermistors in samples 1 to 19 for three minutes. Dielectric strength, that is, magnitude of voltage when each monolithic PTC thermistor was destroyed by application of three minutes' voltage was measured. In addition, obtained figures of dielectric strength were rounded off to the decimal point.

TABLE 2

| Sample Number | Cracks in Glass layer | Permeation of Plating Solution Sn Amount in Ceramic Element (ppm) | Dielectric Breakdown Voltage (V) |
|---|---|---|---|
| *1 | Observed | 65 | 6 |
| *2 | Observed | 25 | 15 |
| 3 | Not Observed | 10 or less | 23 |
| 4 | Not Observed | 10 or less | 24 |
| 5 | Not Observed | 10 or less | 23 |
| 6 | Not Observed | 10 or less | 22 |
| *7 | Not Observed | 10 or less | 12 |
| *8 | Not Observed | 10 or less | 13 |
| *9 | Not Observed | 10 or less | 12 |
| *10 | Observed | 45 | 8 |
| *11 | Observed | 20 | 13 |
| 12 | Not Observed | 10 or less | 20 |
| 13 | Not Observed | 10 or less | 20 |
| 14 | Not Observed | 10 or less | 15 |
| 15 | Not Observed | 10 or less | 22 |
| 16 | Not Observed | 10 or less | 22 |
| 17 | Not Observed | 10 or less | 22 |
| 18 | Not Observed | 10 or less | 22 |
| 19 | Not Observed | 10 or less | 16 |

As shown in Table 2, in samples 3–6 and 12–19 that are within the scope of the present invention, there are no cracks in the glass layer 6 and permeation of plating solution is also acceptable at 10 ppm or less. Furthermore, in chip-type electronic components of which the made of the glass material in samples 3–6 and 12–19, the dielectric breakdown voltage is about 15V or more, thereby having a sufficient dielectric strength. In particular, in sample 3–6 and 15–18, where Li and K are used as a combination of two or more species of alkali metal elements and its atomic ratio falls in the range from 2:8 to 8:2, the dielectric breakdown voltage is excellent, about 22 V or more. In contrast, samples 1, 2, 10 and 11 where the amount of alkali metal elements is less than 20 atomic percent of the atomic total amount of elements except oxygen contained in the glass material, there are cracks in the glass layer 6 without enough effect by alkali metal elements, and the plating solution permeated into the ceramic element 4 by 25 ppm or more. Furthermore, in samples 7–9 that do not contain at least two species of alkali metal elements, a sufficient dielectric strength is not obtained due to the occurrence of ionic conduction, although there are no cracks in the glass layer 6 and permeation of the plating solution is adequately prevented. Also, in samples 14 and 19 where the atomic ratio of the two species of alkali metal elements having a highest ranking among the alkali metal elements contained in the glass layer, is outside of the range from 2:8 to 8:2, though they are covered by the present invention, the dielectric breakdown voltage is somewhat decreased.

Although the present invention has been described in relation to particular embodiments thereof, many other variations and modifications and other uses will become apparent to those skilled in the art. Therefore, the present invention is not limited by the specific disclosure herein, but only by the appended claims.

What is claimed is:

1. A chip electronic component comprising:
   a ceramic element;
   terminal electrodes having a metal coating formed on a surface of the ceramic element; and
   a glass layer formed on at least a part of a surface of the ceramic element where the terminal electrodes are not formed,
   wherein the glass layer contains at least two species of alkali metal elements selected from Li, Na and K, and the atomic total amount of the alkali metal elements is greater than or equal to 20 atomic percent of the atomic total amount of elements except oxygen contained in the glass layer.

2. A chip electronic component according to claim 1, wherein at least Li and K are included as the alkali metal elements.

3. A chip electronic component according to claim 2, wherein the atomic ratio of the two species of alkali metal elements having a highest ranking among the alkali metal elements contained in the glass layer are in a ratio from 2:8 to 8:2.

4. A chip electronic component according to claim 3, wherein the ceramic element contains a semi-conductive ceramic material.

5. A chip electronic component according to claim 2, wherein the ceramic element contains a semi-conductive ceramic material.

6. A chip electronic component according to claim 1, wherein the atomic ratio of the two species of alkali metal elements having a highest ranking among the alkali metal elements contained in the glass layer are in a ratio from 2:8 to 8:2.

7. A chip electronic component according to claim 3, wherein the ceramic element contains a semi-conductive ceramic material.

8. A chip electronic component according to claim 1, wherein the ceramic element contains a semi-conductive ceramic material.

* * * * *